United States Patent
Jakubowski

(10) Patent No.: US 8,448,663 B2
(45) Date of Patent: May 28, 2013

(54) VACUUM RELIEF VALVE

(75) Inventor: William J. Jakubowski, Hawthorn Woods, IL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 348 days.

(21) Appl. No.: 12/657,800

(22) Filed: Jan. 28, 2010

(65) Prior Publication Data

US 2011/0180163 A1 Jul. 28, 2011

(51) Int. Cl.
*F16K 17/04* (2006.01)

(52) U.S. Cl.
USPC .................................. 137/526; 138/42

(58) Field of Classification Search
USPC ................... 137/526, 462; 138/42
See application file for complete search history.

(56) References Cited

U.S. PATENT DOCUMENTS

| | | | | |
|---|---|---|---|---|
| 2,511,435 A | * | 6/1950 | Griswold | 137/510 |
| 3,145,724 A | * | 8/1964 | Pelzer | 137/217 |
| 3,685,534 A | * | 8/1972 | Straitz, III | 137/171 |
| 3,776,264 A | * | 12/1973 | Wenham | 137/469 |
| 3,967,605 A | * | 7/1976 | Dolfi, Sr. | 123/574 |
| 4,049,017 A | * | 9/1977 | Jones | 137/540 |
| 4,073,389 A | * | 2/1978 | Angarola et al. | 410/119 |
| 4,224,044 A | * | 9/1980 | King | 55/385.1 |
| 4,474,211 A | * | 10/1984 | Lucas | 137/599.18 |
| 4,498,493 A | * | 2/1985 | Harris | 137/469 |
| 4,545,398 A | * | 10/1985 | van Olst | 137/216.2 |
| 5,117,860 A | * | 6/1992 | Horner, Jr. | 137/512.1 |
| 5,165,445 A | * | 11/1992 | Vertanen | 137/493.6 |
| 5,180,443 A | * | 1/1993 | Voss | 137/494 |
| 5,215,116 A | * | 6/1993 | Voss | 137/494 |
| 5,240,027 A | * | 8/1993 | Vertanen | 137/73 |
| 5,617,893 A | * | 4/1997 | Webster | 137/526 |
| 5,682,624 A | * | 11/1997 | Ciochetti | 4/509 |
| 5,836,345 A | * | 11/1998 | Ericson | 137/382 |
| 5,918,619 A | * | 7/1999 | Woods et al. | 137/15.19 |
| 5,937,889 A | * | 8/1999 | Krieg | 137/218 |
| 5,954,082 A | * | 9/1999 | Waldorf et al. | 137/202 |
| 5,960,823 A | * | 10/1999 | Wilkins | 137/516.25 |
| 6,997,205 B2 | * | 2/2006 | Kocek | 137/15.01 |
| 7,000,898 B2 | * | 2/2006 | Lim | 251/322 |
| 7,080,657 B1 | * | 7/2006 | Scott | 137/15.18 |
| 7,395,835 B1 | * | 7/2008 | Gohlke | 137/526 |
| 7,493,913 B2 | * | 2/2009 | Hamza | 137/526 |
| 2006/0201556 A1 | * | 9/2006 | Hamza | 137/526 |
| 2007/0007475 A1 | * | 1/2007 | Zvokelj et al. | 251/63.6 |
| 2007/0062594 A1 | * | 3/2007 | Extrand | 138/39 |
| 2008/0029164 A1 | * | 2/2008 | Ciochetti | 137/526 |
| 2009/0314009 A1 | * | 12/2009 | Campeau | 62/48.1 |
| 2010/0139788 A1 | * | 6/2010 | Lackey | 137/526 |
| 2010/0180962 A1 | * | 7/2010 | Degutis et al. | 137/526 |

(Continued)

*Primary Examiner* — Eric Keasel
*Assistant Examiner* — Umashankar Venkatesan
(74) *Attorney, Agent, or Firm* — Seyfarth Shaw LLP

(57) ABSTRACT

A vacuum relief valve is provided. The vacuum relief valve includes a valve body, a filter, a valve stem, a valve seal, a valve seat and valve biasing structure. The valve body includes an interior, an inlet side and a tank side. The inlet side is located substantially opposite the tank side. The filter is located at the inlet side. The valve stem is positioned on the interior the valve body. The valve seal is positioned about the valve stem. The valve seat cooperates with the valve seal to seal the vacuum relief valve. The valve biasing structure is located between the valve seal and the tank side. The valve biasing structure is configured to bias the valve seal towards the valve seat.

5 Claims, 5 Drawing Sheets

U.S. PATENT DOCUMENTS

2010/0313964 A1* 12/2010 Hin et al. .................. 137/15.01
2011/0000557 A1* 1/2011 Pan .............................. 137/526
2011/0073199 A1* 3/2011 Stocker et al. ................ 137/526
2011/0255996 A1* 10/2011 Wickstead et al. ............. 417/53

* cited by examiner

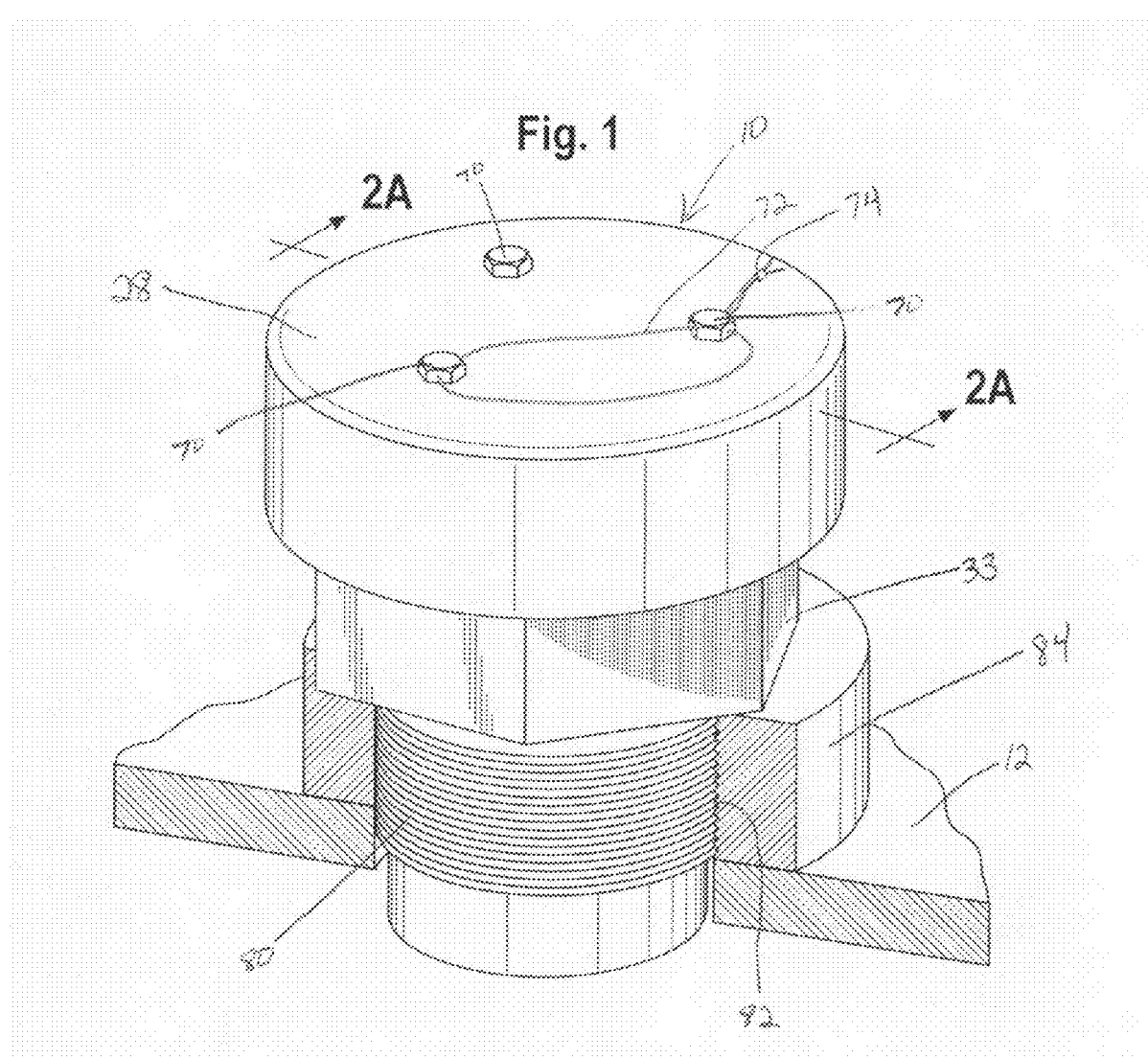

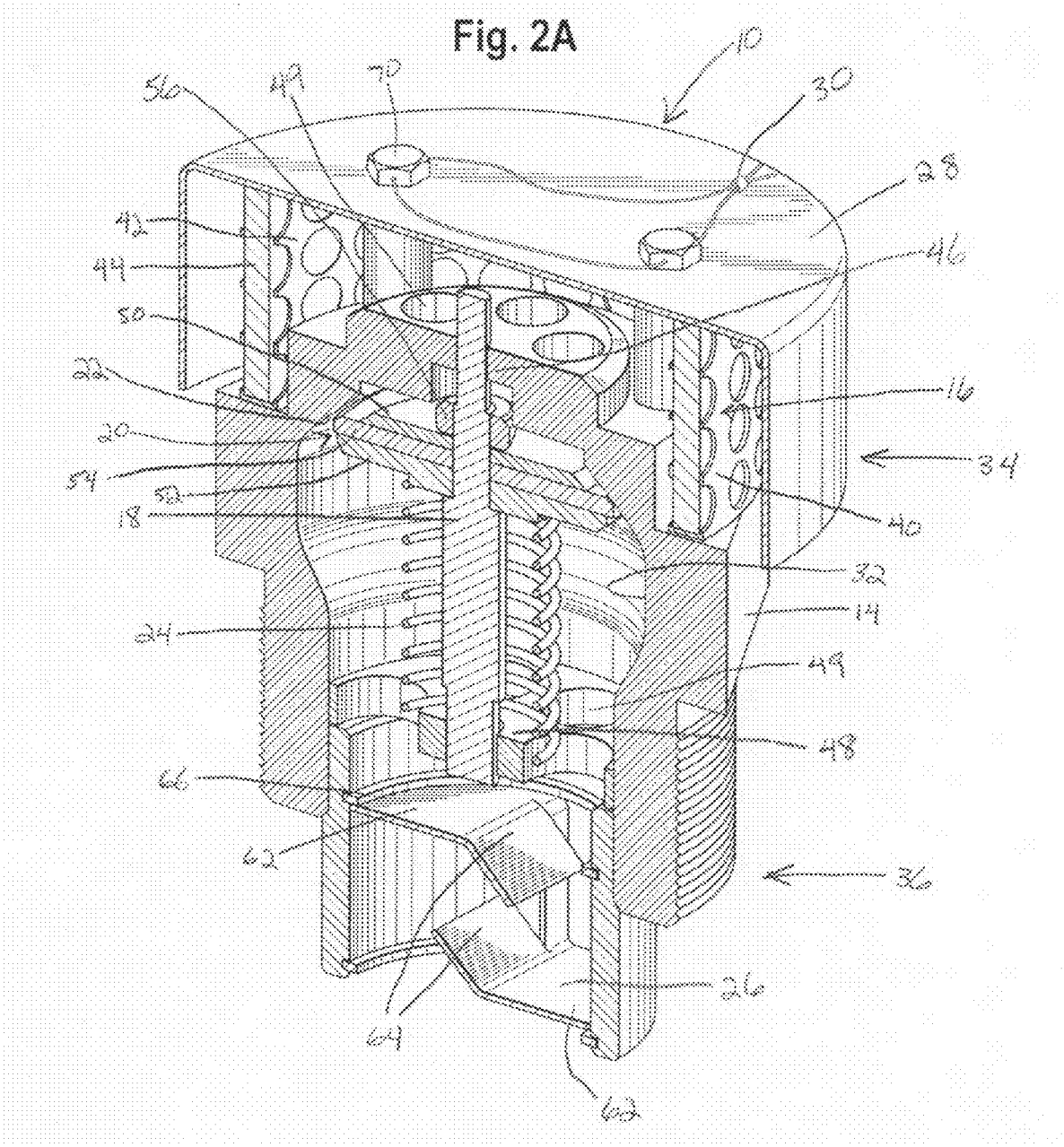

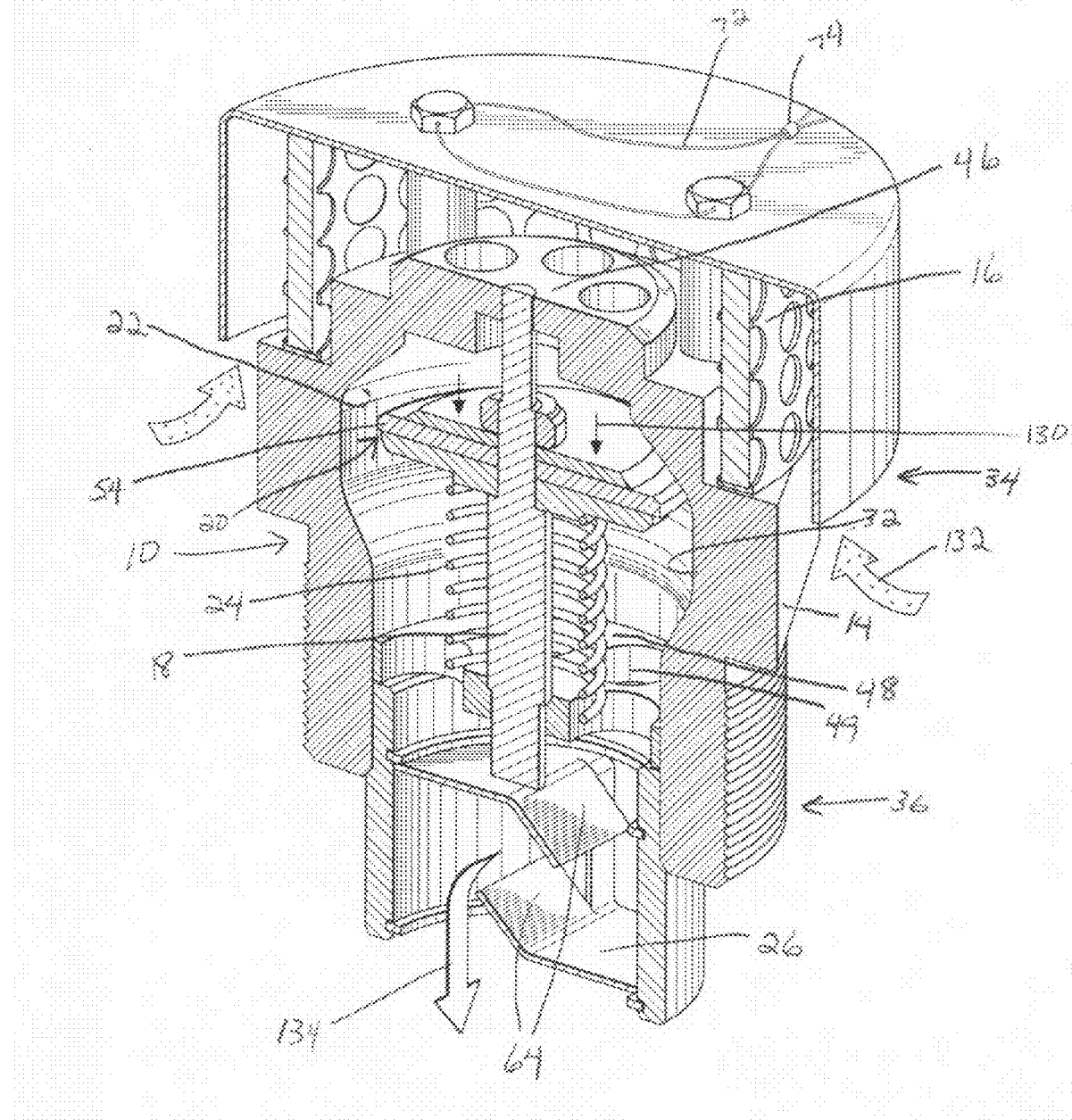

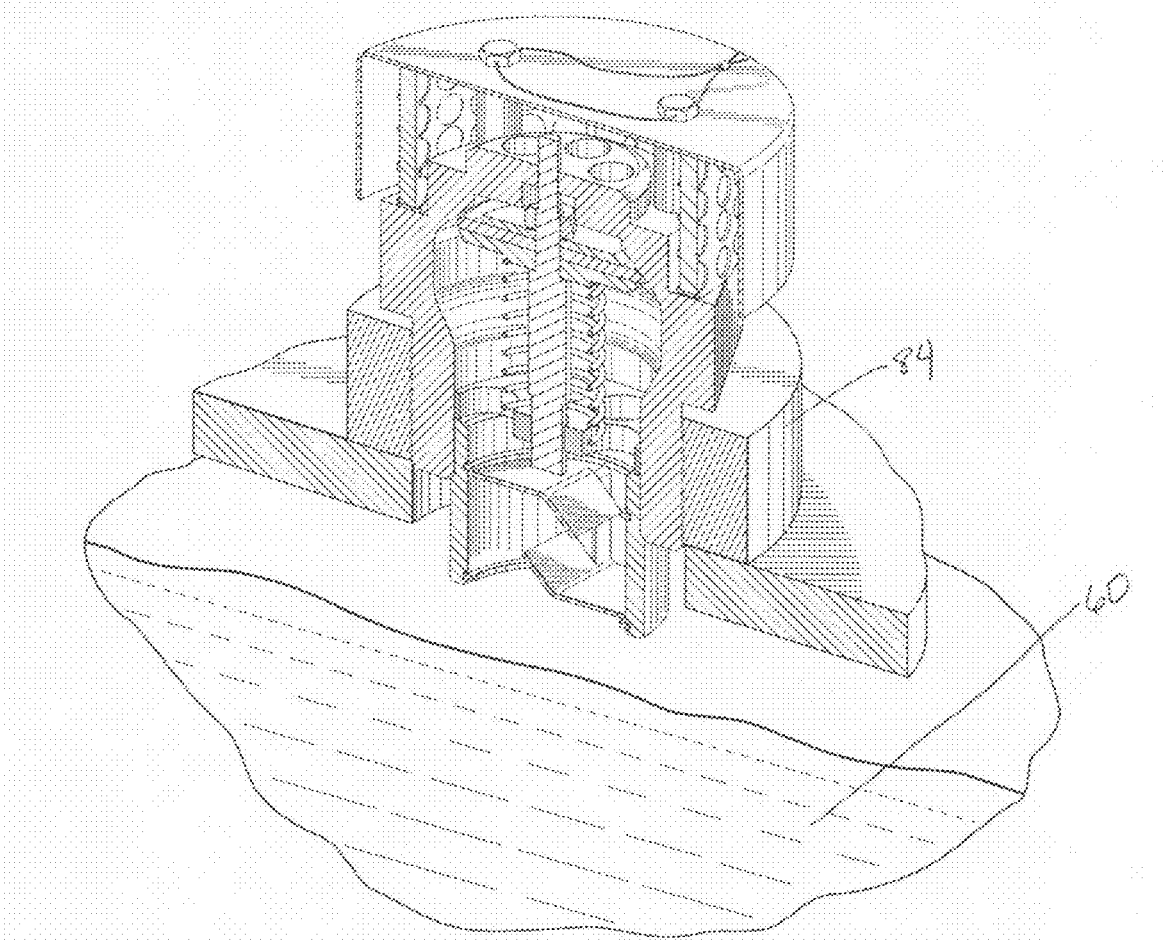

VACUUM RELIEF VALVE

TECHNICAL FIELD OF THE INVENTION

The present device relates to valves. Particularly, the present device relates to vacuum relief valves, such as used on railroad tank cars and other storage and transport containers.

BACKGROUND OF THE INVENTION

Valves and valve systems are used to control pressure within containers and flow into and out of containers. For example, vacuum relief valves are used to control the pressure within a storage vessel such that the negative pressure differential between the storage vessel and the ambient atmosphere is not too large. In this regard, vacuum relief valves permit ambient gas to enter the storage vessel when the pressure within the storage vessel falls below the ambient pressure by a specified amount. The pressure differential can result from a number of factors, including, but not limited to, temperature changes of the vessel or contents, changes in size of the vessel, removal of some or all of the contents of the vessel and other factors. This under-pressure or vacuum can be dangerous and can lead to implosion or damage to the vessel.

Such valves and valve systems can be utilized in a number of applications. For example, these valve systems are often used in rail cars, ISO tanks, tote tanks and other storage vessels for transporting fluids, including liquids and/or gas. Generally, it is preferred to prevent the lading or contents of the tank from contacting or building up on the valve. Particularly, it is often preferred to prevent the lading from contacting the valve seal and/or valve seat to prevent deterioration of the valve seal and seat. Such deterioration can result depending on the type of lading, including, but not limited to corrosive fluid, acidic fluids and the like.

Furthermore, as vacuum relief valves permit ambient gases to enter the vessel under certain conditions, it is preferred to prevent unwanted material from entering the vessel along with the ambient gas. For example, in the case of a railroad tank car, the vessel may be transported around the country between dusty locations and locations having numerous insects where these particles can be sucked into the vessel along with the ambient gas. In this example, it is preferred to prevent the dust and insect from entering and possibly contaminating the lading or otherwise interfering with the operation of the valve.

Additionally, conventional vacuum relief valves oftentimes are prone to malfunction due to age and/or use. For example, the valve stem can become damaged if it is not adequately supported. In this regard, the valves can be serviced to replace and/or maintain the components of the valve. However, if this servicing is not performed properly by a qualified technician, the valve may fail, thereby possibly leaking dangerous materials out into the ambient atmosphere. Therefore, it would be preferred to have some form of security measure to prevent or deter unqualified servicing of the valve or otherwise provide some sort of indication that unqualified servicing had occurred.

SUMMARY OF THE INVENTION

There is disclosed herein an improved vacuum relief valve which avoids the disadvantages of prior devices while affording additional structural and operating advantages.

In one form, a vacuum relief valve is provided. The vacuum relief valve includes a valve body, a filter, a valve stem, a valve seal, a valve seat and a baffle. The valve body includes an interior, an inlet side and a tank side. The inlet side is located substantially opposite the tank side. The filter is located at the inlet side. The valve stem is positioned on the interior the valve body. The valve stem is secured by a first valve guide and a second valve guide. The valve seal is positioned about the valve stem. The valve seal includes a first retainer, a second retainer and a and a sealing portion. The sealing portion is located between the first and second retainers. The valve seal is located adjacent the inlet side when in a closed position. The valve seat is located adjacent the inlet side and cooperates with the valve seal to seal the vacuum relief valve. The baffle is located adjacent the tank side According to one form, a vacuum relief valve is provided. The vacuum relief valve includes a valve body, a filter, a valve stem, a valve seal, a valve seat and valve biasing structure. The valve body includes an interior, an inlet side and a tank side. The inlet side is located substantially opposite the tank side. The filter is located at the inlet side. The valve stem is positioned on the interior the valve body. The valve seal is positioned about the valve stem. The valve seat cooperates with the valve seal to seal the vacuum relief valve. The valve biasing structure is located between the valve seal and the tank side. The valve biasing structure is configured to bias the valve seal towards the valve seat.

In accordance with one form, a vacuum relief valve is provided. The vacuum relief valve includes a valve body, a valve stem, a valve seal, valve biasing structure, a valve seat and a baffle. The valve body includes an interior, an inlet side and a tank side. The inlet side is located substantially opposite the tank side. The valve stem is positioned on the interior the valve body. The valve seal is positioned about the valve stem. The valve seal is located adjacent the inlet side when in a closed position. The valve biasing structure biases the valve seal towards the closed position. The valve seat cooperates with the valve seal to seal the vacuum relief valve. The baffle is located adjacent the tank side.

In one form, the baffle includes at least two baffle sections each having an angled portion extending substantially parallel to one another.

According to one form, the vacuum relief valve further includes a biasing device located between the tank side and the valve seal to bias the valve seal towards the closed position.

In accordance with one form, the biasing structure is a spring.

In one form, the vacuum relief further includes a cap located adjacent the inlet side and substantially covering the filter.

According to one form, the cap is secured to the vacuum relief valve by fasteners, the fasteners including a security device for indicating if the fasteners have been removed.

In accordance with one form, the valve seal comprises a first retainer, a second retainer, and a sealing portion, the sealing portion located between the first and second retainers.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a partial cross-sectional view of a vacuum relief valve installed on a vessel;

FIG. 2A is a cross-sectional view of the vacuum relief valve of FIG. 1 taken along line 2A showing the valve in a closed position;

FIG. 2B, is a cross-sectional view of the vacuum relief valve of FIG. 1 taken along line 2A showing the valve in an open position;

FIG. 3 is a perspective cross-sectional view of a vacuum relief valve installed on a vessel containing lading.

Figure 4:
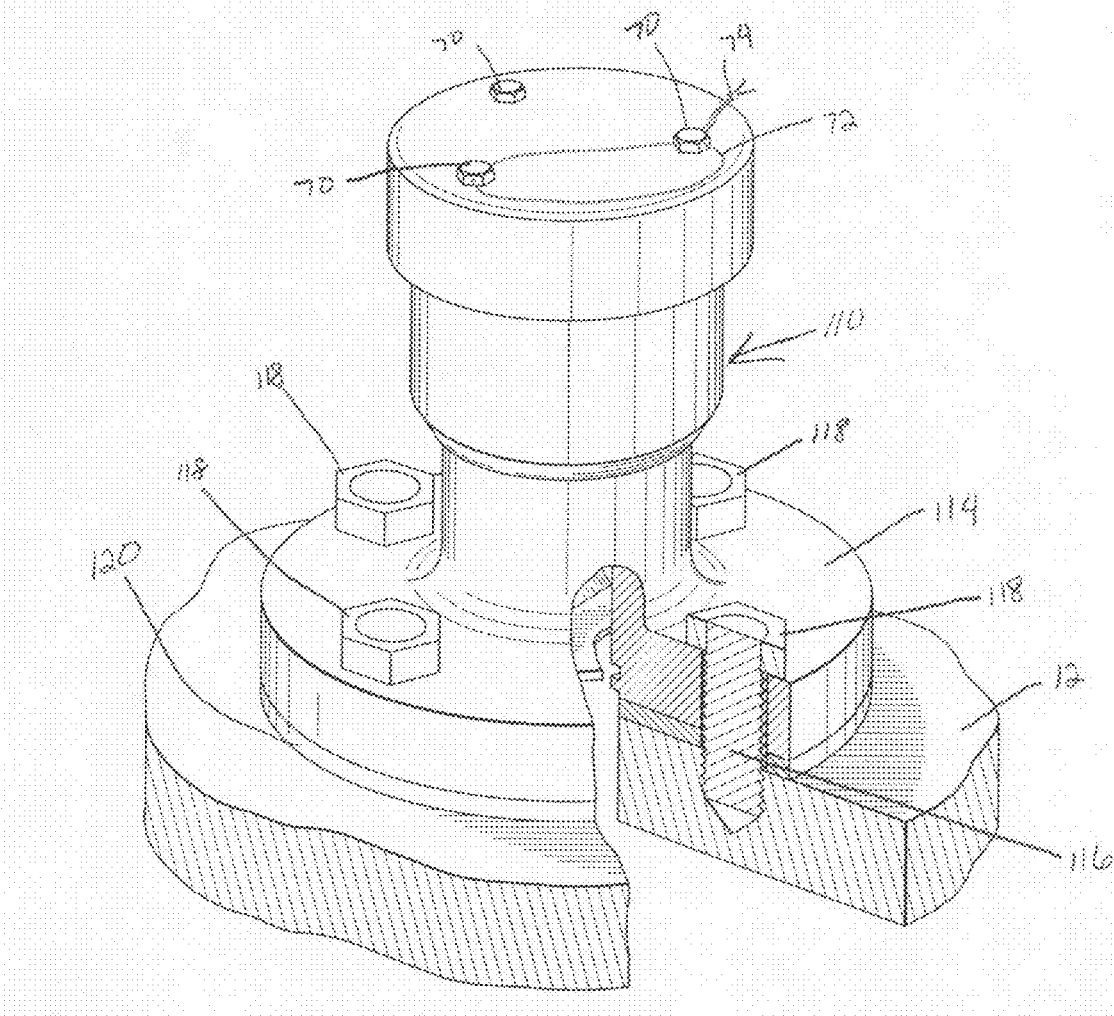
FIG. 4 is a partial cross-sectional view of another vacuum relief valve installed on a vessel.

Various figures are presented to further aid one skilled in the art in understanding the various forms of the tank valve system. However, the present invention should not be construed to be limited to the forms depicted in the figures and described herein.

DETAILED DESCRIPTION OF PREFERRED EMBODIMENTS

While this invention is susceptible of embodiments in many different forms, there is shown in the drawings and will herein be described in detail various embodiments of the invention with the understanding that the present disclosure is to be considered as an exemplification of the principles of the invention and is not intended to limit the broad aspect of the invention to embodiments illustrated.

Referring to FIG. 1, there is illustrated a vacuum relief valve generally designated by the numeral 10. The valve 10 is illustrated as being installed on a vessel 12, such as a railroad car tank, ISO tank, tote tank or other vessel. It should be understood that the valve 10 may be configured to function with any type of vessel or other structure to function as a vacuum relief.

As shown in FIG. 2A, the valve 10 generally includes a valve body 14, a filter 16, a valve stem 18, a valve seal 20, a valve seat 22 and valve biasing structure 24. The valve 10 may also include a baffle 26, a cap 28 and a security device 30.

The valve body 14 includes an interior 32, an inlet side 34 and a tank side 36. It should be noted that, in one form, the inlet side 34 is located substantially opposite the tank side 36. Generally, the inlet side 34 is the portion of the valve body 14 where ambient gases are permitted to enter the valve 10 when the valve opens as a result of a negative pressure situation. Similarly, in one form, the tank side 36 is generally the portion of the valve 10 where ambient gases exit from the valve 10 and enter the vessel 12. In one form, the body 14 is generally a robust structure such that tools such as pipe wrenches can be used to install and uninstall the valve 10 without significantly damaging the valve 10. Further, in one form, such as shown in FIG. 1, the body 14 includes a hexagonal or similarly shaped portion 33 to assist in the installation and removal of the valve 10.

As shown in FIG. 2A, in one form, the filter 16 is located at the inlet side 34 of the valve 10. In one form, the filter 16 includes an inner support 40, an outer support 42 and filter media 44 located between the inner and outer supports 40,42. It should be noted that the filter 16 can be made from any number of different materials as understood by those skilled in the art and depending on the type of environment that the valve 10 will be used. In one form, the inner and outer supports 40,42 are stainless steel mesh while the media 44 is a finer stainless mesh. However, it should be understood that other components may also be used, such as, but not limited to paper, cloth, plastic and the like.

The valve stem 18 is positioned on the interior 32 of the valve 10. In one form, as shown in FIG. 2A, the stem 18 is secured by a first valve guide 46 and a second valve guide 48. In this regard, by having multiple valve guides, the stability of the stem 18 may be improved and may also lower wear on the stem during operation. Comparing FIGS. 2A and 2B, it should be understood that the stem 18 is permitted to move axially relative to the first and second guides 46,48. In one form, the guides 46,48 include one or more apertures 49 to permit ambient gas to flow through the valve 10 when the valve 10 is in the open position.

The valve seal 20 is positioned about the valve stem 18. In one form, the valve seal 20 includes a first retainer 50, a second retainer 52 and a sealing portion 54. The first and second retainers 50,52 cooperate to retain the sealing portion 54 therebetween. The sealing portion 54 cooperates with the valve seat 22 to seal the valve 10. In one form, by using the first and second retainers 50,52, the strength of the seal 20 may be improved and may also decrease the chance of valve failure. Further, the retainers 50,52 help compress the sealing portion 54 and help prevent the seal 20 from blowing out. A locknut 56 or other structure may also be used to help retain the components of the seal 20. Comparing FIGS. 2A and 2B, the valve seal 20 is shown in FIG. 2A in a closed position, sealing against the seat 22, whereas in FIG. 2B, the seal 20 is shown in an open position where the seal 20 has separated from the seat 22. Furthermore, it should be noted that, in one form, the seal 20 and seat 22 are located adjacent the inlet side 34. In this regard, the seal 20 and the seat 22 are fairly removed from the tank side 36 of the valve 10 and are therefore, less likely to come into contact with lading 60 of the vessel 12, such as shown in FIG. 3. Therefore, this may minimize damage to the seal 20 and/or buildup of material on the seal 20. The biasing structure 24 may take a variety of forms. For example, in one form, the biasing structure 24 is a spring that extends between the second guide 48 and the second retainer 52. In this manner, the biasing structure 24 will bias the valve 10 towards the closed position such that the seal 20 will contact the seat 22. However, it should be understood that other forms of biasing structure 24 may also be utilized as understood by those skilled in the art. The baffle 26 may similarly take a variety of forms. For example, in one form, the baffle 26 includes two baffle sections 62 each having an angled portion 64 extending substantially parallel to one another. It should be noted that a single baffle 26 may also be used as understood by those skilled in the art. Similarly, multiple baffles 26 may also be used. The baffle 26 may take the form of a separable component from the valve 10 and/or valve body 14. Alternatively the baffle 26 may be an integrated component of the valve 10 and/or valve body 14. Moreover, the baffle sections 62 may similarly be retained in the valve 10 by structure such as a retaining ring 66 or spring clip. Referring to FIG. 3, if the lading 60 splashes within the vessel towards the valve 10, the baffle 26 can help prevent the lading 60 from contacting the valve seal 20 and seat 22. Moreover, even if the lading 60 were to splash above the lowermost baffle section 62, a higher baffle section 62 can help prevent the splashed lading 62 from moving further in the valve 10. The baffle 26 may help prevent the lading 60 from contacting or otherwise building up at the seal 20 and compromising the integrity of the seal 20. It should be understood that in one form, the baffle 26 does not prevent ambient gas from travelling through the valve 10 when the valve 10 is in the open position.

The cap 28 is positioned generally at the inlet side 34 and substantially covers the filter 16. In one form, the cap 28 is also used to help seal the filter 16 on the valve 10. The cap 28 generally covers the filter 16 and may act to help prevent rain and other particulates from falling directly on and contacting the filter 16. Further, the cap 28 can prevent animals from contacting or otherwise damaging the filter 16. The cap 28 may be secured in any conventional manner understood by those skilled in the art. In one form, the cap 28 is secured through the use of bolts 70 which are anchored to the valve 10.

The security device 30 may also take a variety of forms. Generally, the security device 30 is configured to indicate if the valve 10 has been tampered with or otherwise modified by non-authorized personnel. In one form, the security device 30 is a wire 72 that extends through two or more of the bolts 70 on the cap 28. The wire 72 is further held in place by an indicator 74, such as a non-removable tag, that can only be installed by authorized personnel. In this regard, if the security device 30 has been modified or otherwise removed, it will serve as a warning that the valve 10 may have been tampered with.

The valve 10 may be secured to the vessel 12 in a variety of manners as understood by those skilled in the art. For example, referring to FIG. 1, the valve 10 includes threads 80 which cooperate with corresponding grooves 82 on the vessel 12 or on a flange 84. Therefore, in this form, the valve 10 can be threaded onto the vessel 12. In another form, a valve 110 can include a flange 114 adjacent the tank side 36 that can be connected to the vessel 12 using fasteners, such as bolts 116 and nuts 118. Any number of fasteners can be utilized as understood by those skilled in the art. Other forms of connection are also contemplated as will be understood by those skilled in the art.

Further, the valve 10 may include other structures and features as understood by those skilled in the art. For example, the valve 10 may include any number of gaskets, bolts, connectors, washers, inserts and the like. For example, in FIG. 4, valve 110 includes a gasket 120. Gaskets may also be included at other locations on the valve 10, including, but not limited to, around the filter 16, adjacent the threads 80, adjacent the baffle 26 and other locations.

The operation of the valve 10 will now be briefly described with reference to FIGS. 2A and 2B. As shown in FIG. 2A, the valve 10 is in the closed position. In this regard, the negative pressure difference between the vessel 12 and the ambient atmosphere has not exceeded a threshold. Referring now to FIG. 2B, the negative pressure difference between the vessel 12 and the ambient atmosphere has exceeded a threshold such that the valve 10 is moved to the open position. In this position, ambient gas is permitted to enter through the valve 10 to lower the negative pressure difference between the vessel 12 and the ambient. In this regard, because of the negative pressure difference, the valve seal 20 is moved away from the seal 22 in a direction indicated by arrow 130. The valve stem 18 and seal 20 move along direction 130 against the force of the biasing structure 24. As the seal 20 is in the open position, ambient gas enters the filter 16, as illustrated by arrows 132. The ambient gas at 132 may contain particles, including dust, insects, water vapor and the like, that may be desirable to be removed from the ambient gas before entering the vessel 12. Therefore, in one form, at least some of the particles are removed by the filter 16. The cleaned ambient gas passes through the valve 10 and enters the vessel 12 at arrow 134. As the negative pressure differential decreases, the seal 20 may oscillate to the open and closed positions until the negative pressure differential is small enough such that the seal 20 no longer moves to the open position and therefore stops the flow of ambient gas into the vessel 12.

The valve 10 can be used to help prevent contamination of the lading 60 by particles in the ambient gas from entering the vessel 12. Further, in one form, the valve 10 is designed such that it will not open if the valve is flipped upside down, such as if the vessel 12 were flipped over in an accident.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vacuum relief valve comprising:
a valve body having an inlet side and a tank side, the inlet side being disposed substantially opposite the tank side;
a valve stem movably retained by a first valve guide disposed on the inlet side and a second valve guide disposed on the tank side;
a valve seal movable between opened and closed positions and disposed circumferentially around the valve stem between the first and second valve guides, the valve seal includes a first retainer, a second retainer and a sealing portion, the sealing portion disposed between the first and second retainers such that the first and second retainers compress the sealing portion;
a valve seat cooperating with the valve seal to substantially seal the inlet side from the tank side when the valve seal is disposed in the closed position; and
a baffle disposed on the tank side and including a first baffle section having a first flat portion and a first angled portion extending at a first angle relative to the first flat portion, and a second baffle section having a second flat portion and a second angled portion extending at a second angle relative to the second flat portion, wherein the first angled portion extends substantially parallel to the second angled portion, and the first flat portion and the second flat portion are substantially orthogonal to a direction of flow through the vacuum relief valve.

2. The vacuum relief valve of claim 1, further comprising a biasing device disposed between the second valve guide and the valve seal to bias the valve seal to the closed position.

3. The vacuum relief valve of claim 1, further comprising a filter disposed on the inlet side and a cap substantially covering the filter.

4. The vacuum relief valve of claim 3, further comprising:
a fastener coupling the cap to the valve body; and
a wire extending through the fastener and coupled to the cap by an indicator, at least one of the wire and the indicator adapted to indicate if the fastener is decoupled from the valve body.

5. The vacuum relief valve of claim 3, wherein the filter includes an inner support, an outer support, and a media disposed between the inner and outer supports.

* * * * *